# United States Patent [19]

Woodward

[11] 4,070,237
[45] Jan. 24, 1978

[54] AUTOMATIC VACUUM STABILIZING VALVE

[75] Inventor: Derrick Ronald Woodward, Pointe Claire, Canada

[73] Assignee: JWI Ltd., Canada

[21] Appl. No.: 720,044

[22] Filed: Aug. 30, 1976

[30] Foreign Application Priority Data

Sept. 4, 1975 United Kingdom ............... 36405/75

[51] Int. Cl.$^2$ ......................... D21F 1/52; F16K 15/04
[52] U.S. Cl. ............................... 162/217; 137/533.13; 137/533.15; 162/364
[58] Field of Search ............... 162/217, 252, 363, 364; 137/238, 533, 533.11, 533.13, 533.15

[56] References Cited

U.S. PATENT DOCUMENTS

| | | | |
|---|---|---|---|
| 1,259,317 | 3/1918 | Thomasson | 137/533.11 |
| 1,278,863 | 9/1918 | Crusius | 137/533.11 |
| 1,714,398 | 5/1929 | O'Bannon | 137/533.11 |
| 1,857,393 | 5/1932 | Oliphant | 137/533.11 X |
| 2,137,402 | 11/1938 | Hoferer et al. | 137/533.15 |
| 3,205,127 | 9/1965 | Erbach | 162/363 |

*Primary Examiner*—Richard V. Fisher
*Attorney, Agent, or Firm*—Diller, Brown, Ramik & Wight

[57] ABSTRACT

An automatic adjustable bleed valve having an angularly displaceable valve body provided with an inlet opening and an outlet opening. A passageway interconnects a lower inlet and upper outlet openings. A gravity actuated displaceable valve element is mounted for guided movement in the passageway. A valve element seat is provided internally of the valve body about the inlet opening for receiving the valve element in close seated contact thereon. A stop element is provided internally of the body adjacent the outlet opening to limit the displacement of the valve element while permitting fluid passage from the inlet opening to the outlet opening about the valve element. A locking element is provided to hold the valve body in the desired angular position of adjustment.

14 Claims, 6 Drawing Figures

AUTOMATIC VACUUM STABILIZING VALVE

BACKGROUND OF THE INVENTION a. Field of the Invention

The present invention relates to an improved automatic valve for controlling the vacuum in an enclosed container such as, for example, a suction box as used on a paper making machine.

b. Description of Prior Art

In the operation of the conventional paper making machine, the paper is formed by flowing a thin suspension of stock fibers in water from a head-box slice onto the upper surface of a moving endless screen belt which rotates over a breast roll at one end of the forming section of the machine, and a couch roll at the other end. As the belt travels in contact with table rolls or foils and suction boxes located between the breast and couch rolls, water is withdrawn from the stock through the belt leaving a thin formation of self-supporting, matted fibers on the upper surface of the belt. The sheet of formed fibers is lifted off the belt at the couch roll at the downstream end of the forming section and the belt, after travelling around the couch roll, is returned through a series of return rolls to the upstream end of the forming section where it travels around the breast roll and again passes under the slice to complete the cycle.

Most of the water is drained from the stock by the table rolls or foils. The stock is then further dewatered as it passes over the suction boxes under the belt. Suction boxes extend transversely of the forming section of the machine. Generally, a series of four or more suction boxes is positioned under the upper run of the belt towards the couch roll end of the forming section. Each box is constructed in the form of a long enclosed container approximately one foot or more in width and in depth. The cover of the suction box that contacts the underside of the screen belt is made of some durable material that resists wear and in turn provides support for the belt with a minimum of friction. The cover may be end-of-grain maple wood or in more recent installations some kind of hard wearing ceramic material. The cover is provided with an array of circular openings, or in some cases, slots that permit water to be drained by suction through the belt and into the interior of the suction box. In operation, a vacuum is maintained in the box by withdrawing air through an opening at one end. Water drained from the stock collects in the box and is evacuated through downspouts, or downcomers as they are called, through self-sealing trap fixtures. The water builds up to the required depth in the downcomer equivalent to the amount of vacuum that is to be maintained in the box. In the case of the suction boxes with which this invention is concerned, the vacuum may be high, up to 10 inches of mercury or low, less than 25 inches of water. The invention has been found to work particularly well in the low vacuum ranges.

Vacuum is maintained in a header pipe at the paper machine which is connected to each of the series of suction boxes by an exhaust pipe at the rear side of the machine. The vacuum in the header pipe is generally slightly greater than required and is controlled in each suction box either by a simple hand operated bleed valve at the front side of the machine or a mechanically complicated automatic valve with a vacuum sensor system, to control and maintain constant vacuum at the exhaust pipe leading from a suction box to the vacuum header pipe.

In the case of the hand operated bleed valve, the valve is opened sufficiently to allow the passage of air into the suction box to reduce vacuum therein to the desired amount as registered on a vacuum gauge. This hand operated bleed valve system needs constant surveillance because many variables will necessitate adjustment to maintain constant vacuum within the suction box. Variations in the vacuum source, in the pulp stock such as fiber content or fillers, in slice opening or in speed of the machine will all influence suction box vacuum. Changes in table configuration such as removal or addition of foils will also require adjustment to be made to suction box vacuum.

The conventional automatic valves are mechanically complicated and, being on the exhaust side of the suction box, they are frequently fouled by fibers of paper stock being sucked into the box, so that they may become inaccurate or non-functional.

Conventional poppet or ball type check valves are not generally adjustable. Known vacuum relief valves that are adjustable are either provided with a spring loaded diaphragm or spring loaded ball and seat arrangement. Such valves open against the loading set on a compressed spring and as the valve opens wider the spring is compressed to a greater extent so that, unless it is relatively long, the loading increases. Equilibrium may therefore be reached at a point where insufficient volume of air can pass the valve to maintain the desired vacuum in the suction box and the valve becomes difficult to set. Further, such valves are subject to inaccuracies because of corrosion or mechanical failure.

SUMMARY OF THE INVENTION

The present invention provides a simple means of controlling vacuum within a suction box by an automatic bleed valve that has simple moving parts, is adjustable over a complete range of vacuum and which is self-cleaning of foreign particles that may be entrained therein. Further, in the event that it should become unserviceable by dirt or wear, it can be cleaned or repaired in a matter of minutes without stopping the paper machine.

According to a broad aspect of the present invention there is provided an automatic bleed valve having a valve body having means defining a lower inlet opening and an upper outlet opening. A passageway interconnects the inlet and outlet openings. A gravity actuated displaceable valve element is mounted for guided movement in the passageway. A valve element seat is provided internally of the valve body about the inlet opening for receiving the valve element in close seated contact thereon. A stop element is provided internally of the body adjacent the outlet opening to limit the displacement of the valve element while permitting fluid passage from the inlet opening to the outlet opening about the valve element. The outlet opening is connectable to a vacuum system wherein the passageway is in communication with a vacuum chamber. Adjustment means is also provided to control the angular position of the long axis of the valve body with respect to a vertical axis to vary the vertical weight component of the valve element and thereby regulating the amount of vacuum, in the vacuum chamber, required to cause the valve element to be displaced off its seat.

BRIEF DESCRIPTION OF THE DRAWINGS

The invention will now be described with the help of the accompanying drawings in which.

DESCRIPTION OF PREFERRED EMBODIMENT

Figures 1A, 1B:
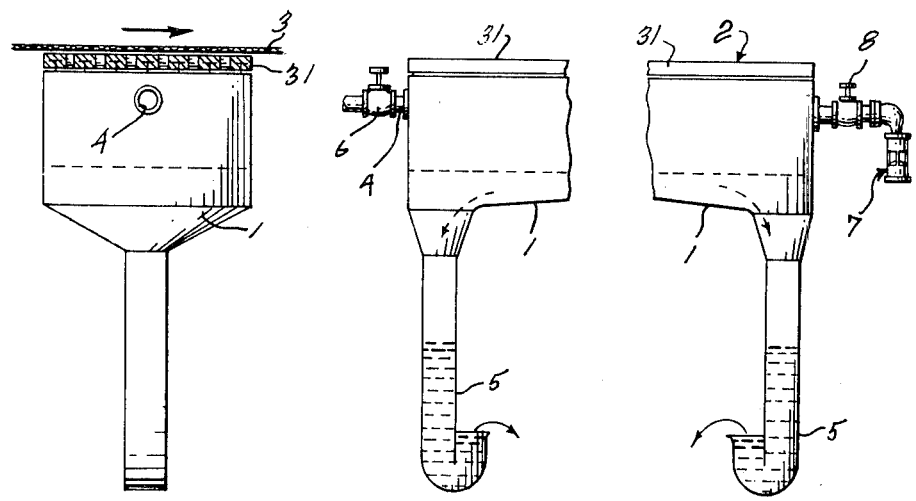
FIGS. 1A and 1B show a conventional low vacuum suction box, such as for example, as shown in British Pat. No. 1,285,532, to which the automatic bleed valve of this invention has been attached.

In FIGS. 1A and 1B, numeral 1 denotes the suction box structure having a cover 2, which in this case is shown as a slotted type having screen belt supporting bars 31 which are slideably mounted on rails by T-connections. Numeral 3 denotes a screen belt, 4 is the exhaust pipe, 5 are downcomers, 6 is a hand operated valve on the exhaust pipe, 7 is the automatic bleed valve of the present invention and 8 is a hand operated shut-off valve between the bleed valve 7 and the suction box 1.

Figures 2A, 2B:
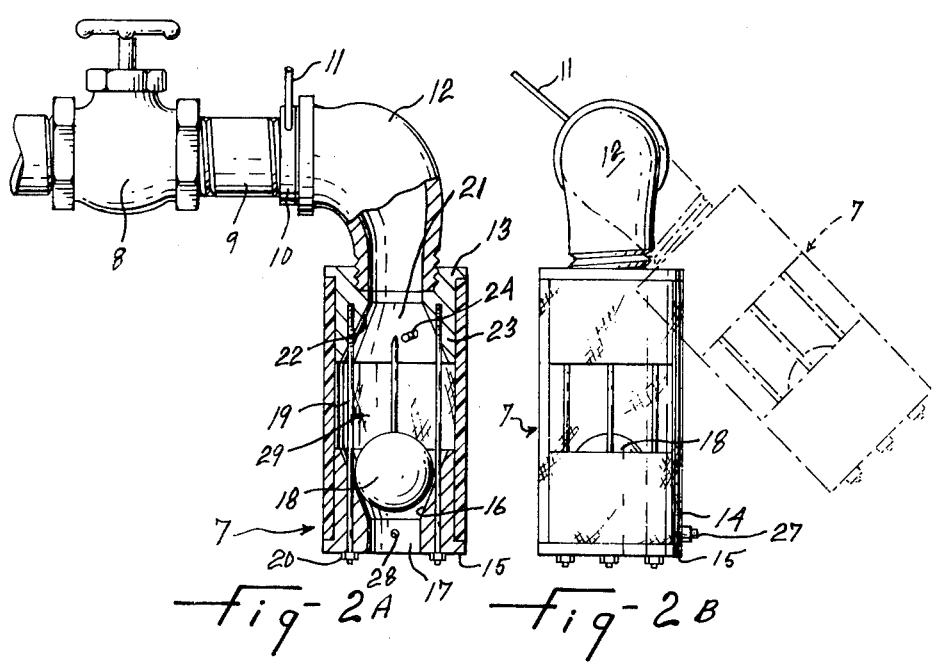
FIGS. 2A and 2B shown details of the bleed valve of this invention.

In FIGS. 2A and 2B, numeral 9 denotes a connecting nipple which has been rethreaded with standard machine threads on the end to be connected to the bleed valve. Numeral 10 denotes a threaded locking collar provided with a handle 11 which constitutes a locking means to keep valve 7 in the desired angular position. An extension conduit, herein a standard reducing elbow connection 12, is threaded on the threads of nipple 9 which forms horizontal support means. A celeron top cap 13 is threaded internally to screw onto the other end of elbow 12. The cap 13 has a neck 23 adapted to fit tightly into a piece of thick tubing 14. A cylindrical celeron bottom cap 15, made similar to top cap 13, fits tightly into the bottom end of the tube 14. Cap 15 is provided with an inlet opening 17 having internally tapered sides 16 to provide a conical lower valve seat. A metal ball 18, being about ¼ inch to ½ inch larger in diameter than the opening 17, constitutes a valve element to close the opening 17. Four guide members herein rods 19 are spaced to loosely accommodate the ball 18, and pass through the bottom cap 15, and extend within the passageway 29 and screw into the top cap 13. These rods 19 serve as studs to hold the valve assembly together with nuts 20 and to guide the ball 18 in the passageway 29 defined in the valve body between the inlet and outlet passages 17 and 21.

In order to prevent dirt, such as fiber particles normally found in air surrounding paper making machines, from entering the bleed valve 7 and clogging the valve moving element there is provided a small water duct 27 in the bottom cap 15. The duct 27 connects to an orifice 28 located in the inlet opening 17 of the valve to inject a fine spray of water in the inlet opening 17 which maintains the ball(s) 18 clean throughout the operation of the valve 7.

In operation, a vacuum is applied to the suction box 1 and acts to withdraw water from the layer of pulp stock on the fourdrinier wire 3 as it pass over the spaced supporting bars of the box cover. The water is drained to the downcomers 5 in the interior of the box 1, over a slight slope in the bottom of the box and finds its level differential in the downcomers 5 according to the amount of vacuum in the box. The bleed valve 7 which is also connected to the interior of the box unit will allow a flow of air to enter the box unit when the vacuum is sufficient to overcome the weight of the ball 18 in the conical seat of the bleed valve. The ball 18 in effect floats on a column of air passing through the valve 7. Thus, when the valve 7 is in the vertical position (shown in FIG. 2B), it will allow a flow of air when the vacuum exceeds the full weight of the ball 18 and lifts it from the conical seat 16. As the valve is rotated off the vertical position (see position in phantom lines FIG. 2B) the load of the ball, that is, its vertical component force, will decrease and therefore the valve will open at a lower vacuum pressure. The size of the opening 17 and the size and material of the ball 18 will determine the vacuum range of the bleed valve. The taper of the conical valve seat 16 will be sufficient to prevent jamming of the ball in the seat and in any case will be cut approximately a 50° included angle.

To set the vacuum unit, the bleed valve is positioned vertically and the source vacuum valve 6 is opened until vacuum is just above that required as indicated on a suction box gauge (not shown). The bleed valve 7 is then rotated to bleed air into the system until the vacuum level required in the suction box is reached. The lock nut 10 is then tightened against the flange of elbow 12 to hold the bleed valve in the set position. Thus, the lock nut 10 in combination with the threaded engagement of the bleed valve to a vacuum system constitutes an adjustment means. The vacuum will then automatically stabilize itself through the valve as the vacuum tends to fluctuate due to changes in the density of the stock passing over the holes in the suction box.

Of course, the weight of the ball 18 and the angle of the valve 7 is such to maintain the ball 18 in a floating state, during operation, so that it cannot travel under the influence of inrushing air, to lodge itself in the outlet opening 21 to interrupt the air flow. This is prevented by providing a suitable stop rod 24 or fin (shown in FIGS. 3A and 3B) extending in the travel path of the ball close to the outlet opening 21 whereby to stop the ball at a location where clearance will exist between the inside wall 22 of the top cap 13 and the ball 18.

Figures 3A, 3B:
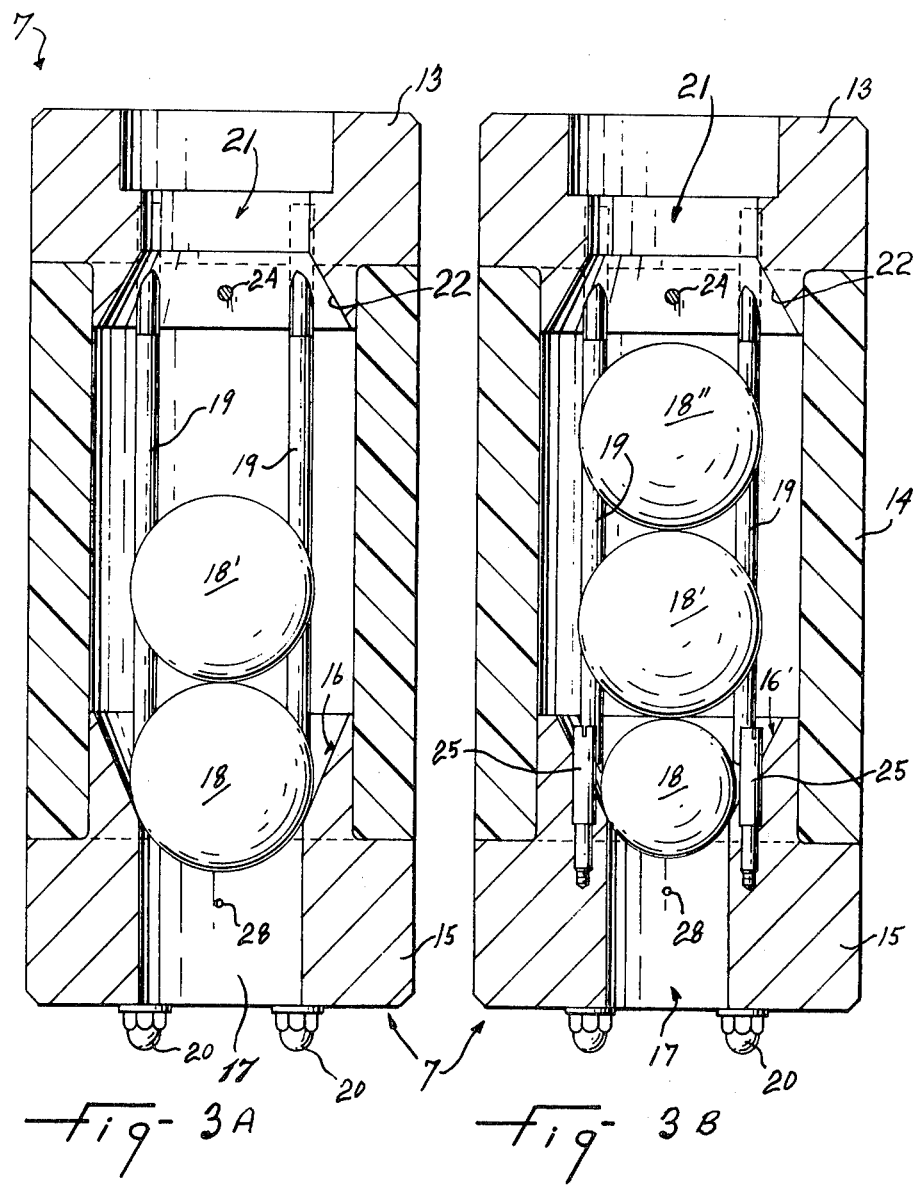
FIGS. 3A and 3B show modifications of the bleed valve of this invention.

Referring to FIG. 3A there is shown a further embodiment of the bleed valve 7. As herein shown an additional ball 18' is provided above the ball 18 to add more weight to the valve element or ball 18. Thus, the bleed valve 7 may be used in higher vacuum systems as higher pressures will be required to displace the ball 18 from its seat 16. If desired, and as shown in FIG. 3B more than one additional ball may be added on top of the ball 18.

In a high vacuum system, the pressure differential being much greater, a smaller orifice may be used and the bottom valve element ball can be reduced in size accordingly. Thus, as shown also in FIG. 3B, larger balls providing greater weight multiples may be used to rest on top of the smaller valve element ball and in this way the overall length of the unit may be kept within reasonable limits as there will not be as many of the larger balls required. Where smaller valve element orifice and ball are used in a high vacuum system additional guide elements, herein rods 25, are provided in the seat 16' and extend longitudinally to guide the smaller ball 18. The length of these guide rods 25 is sufficient to retain the ball 18 in alignment regardless if the top ball 18" is fully displaced to its maximum and in contact with the stop rod 24. As shown in the embodiments of FIGS. 3A and 3B the top caps 13, the bottom caps 15 and the body portion or tubing 14 are still secured by the guide rods 19 and lock nuts 20.

Experiment have been made on a prototype bleed valve. This was constructed with a 50° inclusive angle for the tapered seat 16, a 1 inch diameter stell ball 18 and a ¾ inch opening 17. The valve 7 was found to bleed a consistent amount of air through the opening 17 depending upon its set position. If the valve were rotated up to a horizontal position, it bled air to the size of the orifice and the vacuum in the box reached zero. In further experiments, it was found that a 2 inch diameter ball and a larger orifice gave steadier control. In actual practice the size of the ball and orifice would depend on the quantity of air that is to be bled into a suction box. If the valve is to be used on low vacuum units, a preferred size for a stell ball would be 2 inches in diameter and the corresponding orifice size would be about 1¾ inch.

In a high vacuum unit, wherea smaller valve element ball is used the diameter of this ball would be closer to 1½ inch the diameter of added balls closer to 2 inches. The diameter of the orifice would be of the order of 1¼ inch to accommodate the smaller ball.

Features of the bleed valve of this invention are its simplicity, accuracy and reliability. Once the valve is set to maintain the required vacuum in the suction box, since it is actuated only by gravity, it will generally require no further attention. The ball is the only part that moves and since this is substantially stationary in operation and being supported by relatively clean air and perhaps also by a clean spray of water being bled into the system, there is virtually no wear on any part that would require replacement or adjustment. In the event replacement of th valve is required because of damage, the shut-off valve 8 may be closed temporarily while the bleed valve unit 7 is repaired or replaced. In most cases, it would not be necessary to stop the paper machine while repairs are being made.

It is not intended that the automatic bleed valve of this invention be limited for use only in low vacuum systems or for use only on paper machine suctions boxes. It is within the ambit of the invention that it can be used in any fluid system that may be controlled by a constant bleed valve. In the case of high vacuum systems, the potential range of the valve may be multiplied by simply adding one or more balls on top of the single ball in the tube 14 and lengthening the tube accordingly. This would have the effect of multiplying the weight of the single ball by a factor equal to the total number of balls in the tube.

I claim:

1. An automatic adjustable bleed valve comprising a valve body having means defining a lower inlet opening and an upper outlet opening with a passageway interconnecting said inlet and outlet openings, said valve body having a long axis, a displaceable gravity actuated valve element mounted for guided movement in said passageway, a valve element seat internally of said valve body about said inlet opening for receiving said valve element in close seated contact thereon, stop means internally of said body adjacent said outlet opening to limit the displacement of said valve element whilst permitting fluid passage from said inlet opening to said outlet opening about said valve element, horizontally disposed support means for connecting said outlet opening to a vacuum system with said passageway being in communication with a vacuum chamber, and adjustment means between said valve body and said horizontally disposed support means to control the angular position of said long axis of said valve body with respect to the vertical to vary the vertical weight component of said valve element and thereby regulate the amount of vacuum required to cause said valve element to be displaced off its seat.

2. An automatic bleed valve as claimed in claim 1 wherein said adjustment means is constituted by a locking element carried by said horizontally disposed support means and manually engageable with said valve body to secure it in a desired angular position with respect to the vertical.

3. An automatic bleed valve as claimed in claim 2 wherein said horizontally disposed support means is a threaded connecting element in threaded engagement with said valve body and said locking element is a lock nut in threaded engagement with said threaded connecting element adjacent said valve body.

4. An automatic bleed valve as claimed in claim 3 wherein said valve body includes a right angle extension conduit above said outlet opening, said valve body having its long axis extending transverse to the long axis of said threaded connecting element.

5. An automatic bleed valve as claimed in claim 2 wherein said displaceable valve element is a ball, said ball being captive between guide members secured in said passageway and permitting fluid to flow about said ball when said ball is displaced from said valve element seat.

6. An automatic bleed valve as claimed in claim 5 wherein one or more additional balls are captive between said guide members and positioned on top of said ball.

7. An automatic bleed valve as claimed in claim 6 wherein said ball is of smaller diameter than said additional balls, said inlet opening having a smaller open area than said outlet opening.

8. An automatic bleed valve as claimed in claim 7 wherein additional guide elements are positioned about said inlet opening to guide said smaller diameter ball through its displacement in said passageway.

9. An automatic bleed valve as claimed in claim 5 wherein said valve body includes top and bottom caps and an open ended tubular body portion, said guide members being rods for securing said top and bottom caps together at a respective end of said open ended tubular body portion, said inlet and outlet openings being provided in a respective one of said top and bottom caps said valve element seat being a conical cavity in said bottom cap internally of said valve body and disposed concentrically of said inlet opening.

10. An automatic bleed valve as claimed in claim 5 wherein a means defining an orifice is provided in a wall of said valve body adjacent said inlet opening for injecting a liquid spray in said inlet opening to clean said ball of foreign particles sucked into said inlet opening during operation of said valve.

11. In a suction box for use in a paper making machine and having a supporting surface for extracting water from pulp stock passing thereover and means creating a vacuum connected to said box, the improvement comprising an automatic adjustable bleed valve adjustably connected to said suction box to control the vacuum pressure in said suction box, said bleed valve comprising a valve body having means defining a lower inlet opening and an upper outlet opening with a passageway interconnecting said inlet and outlet openings, said valve body having a long axis, a displaceable gravity actuated valve element mounted for guided movement in said passageway, a valve element seat internally of said valve body about said inlet opening for receiving said valve element in close seated contact thereon, stop means internally of said body adjacent said outlet opening to limit the displacement of said valve element whilst permitting fluid passage from said inlet opening to said outlet opening about said valve element, said outlet opening being connected to said means creating a vacuum in said box wherein said passageway is in communication with a vacuum chamber and adjustment means to control the angular position of the long axis of said valve body with respect to the vertical to vary the vertical weight component of said valve element and thereby regulate the amount of vacuum, in said chamber, reguired to cause said valve element to be displaced off its seat.

12. A suction box as claimed in claim 11 wherein said adjustment means is constituted by a locking element manually engageable with said valve body to secure it in a desired angular position.

13. A suction box as claimed in claim 12 wherein a manually operable shut-off valve is secured between said outlet opening and said suction box.

14. A method of controlling vacuum pressure in a suction box for a paper making machine comprising the steps of:
  i. applying a vacuum to said suction box,
  ii. connecting an adjustable automatic air bleed valve to said suction box to admit air in said box when vacuum pressure in said box exceeds a desired value, said bleed valve having an angularly displaceable valve body having a long axis, and
  iii. adjusting the angular position of the long axis of said bleed valve with respect to the vertical to adjust its sensitivity and capacity to permit said admission of air at said desired value.

* * * * *